United States Patent [19]

Miura et al.

[11] Patent Number: 4,574,616

[45] Date of Patent: Mar. 11, 1986

[54] VIBRATION DETECTING APPARATUS

[75] Inventors: Kazuhiko Miura, Aichi; Takashi Hattori, Okazaki; Tadashi Ozaki, Gamagori; Hiroaki Yamaguchi, Anjo, all of Japan

[73] Assignee: Nippon Soken, Inc., Nishio, Japan

[21] Appl. No.: 595,357

[22] Filed: Mar. 30, 1984

[30] Foreign Application Priority Data

Apr. 1, 1983 [JP] Japan ................... 58-58279

[51] Int. Cl.⁴ ............................. G01L 23/22
[52] U.S. Cl. ....................... 73/35; 267/158; 310/329
[58] Field of Search ............ 73/35, 654; 310/329, 310/338, 355; 267/158, 159, 161

[56] References Cited

U.S. PATENT DOCUMENTS 4,364,259 12/1982 Muranaka et al. .................. 73/35

FOREIGN PATENT DOCUMENTS 408444 12/1944 Italy ................................ 267/161

Primary Examiner—Stewart J. Levy
Assistant Examiner—John E. Chapman, Jr.
Attorney, Agent, or Firm—Cushman, Darby & Cushman

[57] ABSTRACT

A vibration detecting apparatus comprises a housing having at one end thereof an opening, a piezoelectric element disposed within the housing, a connector mounted to the housing to cover the opening thereof and having an output pin, a lead wire for electrically connecting the piezoelectric element with the output pin, and an initially conical annular spring having an outer peripheral edge portion thereof received by an annular groove formed in an inner peripheral wall of the housing. The piezoelectric element is biased by the initially conical annular spring.

5 Claims, 11 Drawing Figures

VIBRATION DETECTING APPARATUS

BACKGROUND OF THE INVENTION

1. FIELD OF THE INVENTION

The present invention relates to a vibration detecting apparatus, and more particularly to a vibration detecting apparatus suitable for use in an observation of vibration generated on an internal combustion engine, which is adapted to detect a generation of knocking through the observation of vibration transmitted to the outside of a cylinder of the internal combustion engine due to an interior pressure change in the cylinder and control an ignition timing so that the knocking is suppressed below a predetermined magnitude.

2. DESCRIPTION OF THE PRIOR ART

It is generally known that the ignition timing and the interior pressures in cylinders are closely correlated with each other. As the ignition timing advances, a vibration component of high frequency (generally, 6 to 9 KHz, 11 to 13 KHz, and 16 to 19 KHz), which is determined by a bore diameter of the engine cylinder and the speed of sound in combustion, increases to cause a knocking as a vibration or sound transmitted to the outside of the cylinder and a magnitude of the knocking also increases. The knocking is generally referred to as "trace knock" in early stage of its generation, "light knock" in its gradually increasing stage, and "heavy knock" in its further increasing stage. To better the efficiency of an internal combustion engine without exerting any adverse effect on the engine, it is necessary to feedback control the ignition timing so that the engine is constantly maintained in the state of trace knock. In consequence, there is a need for a vibration detecting apparatus which can operate accurately and stably under severe environmental conditions.

A conventional detecting apparatus of this kind, for example, employs an ordinary acceleration detecting apparatus for this purpose. Such conventional detecting apparatus includes a detecting apparatus which has a resonance frequency thereof set higher than a frequency band in which the knocking is generated and has a substantially flat frequency characteristic below the knocking frequency band (hereinafter referred to as "non-resonance type detecting apparatus" in this specification and the claims appended thereto), and a detecting apparatus which has a resonance frequency thereof set correspondingly to the knocking frequency so that the sensitivity near the resonance frequency is much higher than that at other frequencies (referred to as "resonance type detecting apparatus", hereinafter). The resonance type detecting apparatus has a high resonance peak or quality factor Q. Accordingly, when a resonance frequency of the resonance type detecting apparatus is set to correspond to the knocking frequency, the SN ratio with respect to the knocking frequency becomes higher. In this type of detecting apparatus, however, it is inconveniently difficult to make the resonance frequency correspond to the knocking frequency and if the resonance frequency is somewhat offset from the knocking frequency, the SN ratio decreases considerably. In addition, the knocking frequency generally differs depending on the type of internal combustion engine, and even in the same internal combustion engine there are variations of knocking frequency between cylinders thereof. Moreover, the knocking frequency may fluctuate in accordance with the engine operation conditions, such as the engine speed.

To obviate the above-mentioned disadvantages, a non-resonance type detecting apparatus is taken into consideration since it is not necessary to select different detecting apparatuses according to the type of internal combustion engine. The most effective non-resonance type detecting apparatus employs as its detecting means a piezoelectric element which allows the detecting apparatus to be reduced in size, and has a resonance frequency thereof set at a high frequency where it is not affected by the knocking frequency. This detecting apparatus is mounted to an engine block, for example, of an internal combustion engine which is to be subjected to the detection of knocking. A typical conventional non-resonance type detecting apparatus of this kind is composed of a detecting means for detecting a vibration generated on an engine block of an internal combustion engine; a connector; a signal transmitter for transmitting a signal from the detecting means to the connector; and a housing for covering the detecting means and the signal transmitter to protect both of them.

The detecting means includes a piezoelectric element for converting a mechanical vibration generated on the engine block into an electric signal. The piezoelectric element is screw-mounted to one end wall portion of the housing by means of a screw, a washer and the like and biased.

Further, the connector having an output pin is mounted to the housing. The piezoelectric element and the output pin are electrically connected through a lead wire soldered to both of them.

This detecting apparatus necessitates a soldering work in order to connect the piezoelectric element with the output pin through the lead wire and therefore it is troublesome to assemble. In addition, the detecting apparatus is insufficient in reliability since there is a fear that in the case of a use over a long period of time, a vibration may cause the lead wire to be disconnected or separated at its soldered portions. Moreover, since the piezoelectric element is screw-mounted by means of a screw and the like, the piezoelectric element requires a bore for receiving the screw. In consequence, there is a need for a process for boring after calcination and the detecting area decreases, so that the output impedance is increased and then the detecting apparatus is easily affected by noises.

In another conventional non-resonance type detecting apparatus, an initially conical spring made of an electrically conductive material is disposed between a piezoelectric element within a housing and a connector by which the housing is capped. Although this detecting apparatus has a simple construction and is readily assembled, the reliability thereof is insufficient in the case of a use over a long period of time, since the initially conical spring, which biases the piezoelectric element, simultaneously urges the connector so as to be drawn out from the housing.

SUMMARY OF THE INVENTION

Accordingly, it is an object of the present invention to provide a non-resonance type detecting apparatus which is readily manufactured and assembled as well as has a reliability in use over a long period of time.

According to the invention, a detecting apparatus is provided, in which a housing is provided on an inner peripheral wall thereof with an engaging means such as an annular groove and an initially conical annular spring is engaged with the engaging means to bias the piezoelectric element so as to improve the reliability. In addition, the initially conical spring is provided therein with a circumferential discontinuous portion so that it can be mounted to the engaging means. Further, a detachable connecting means is employed to transmit the signal from the detecting means to the output pin.

The above and other objects, features and advantages of the invention will become clear from the following description of the preferred embodiments thereof taken in conjunction with the accompanying drawings.

DESCRIPTION OF THE PREFERRED EMBODIMENTS

Figure 1:
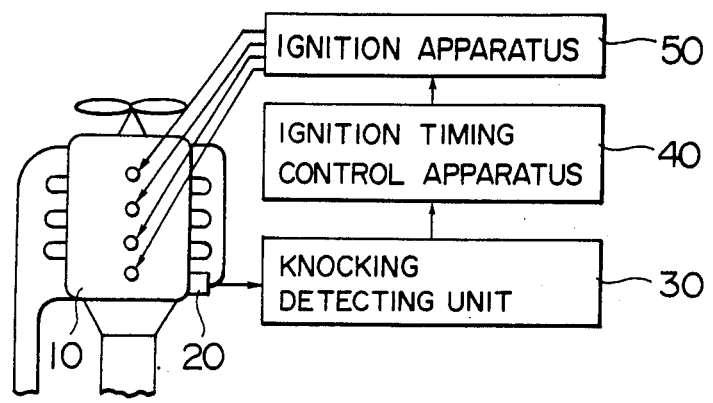
FIG. 1 shows an ignition timing control system of an internal combustion engine to which a detecting apparatus in accordance with an embodiment of the invention is applied.

Referring first to FIG. 1, a four-cylinder in-line internal combustion engine 10 has a vibration detecting apparatus 20 screw-mounted to its cylinder block. A knocking detecting unit 30 detects any knocking on the engine 10 from an output signal from the detecting apparatus 20. An ignition timing control apparatus 40 controls the advance angle in accordance with the output of the detecting unit 30 so that the ignition timing is optimized. The output signal from the control apparatus 40 operates a known ignition apparatus 50 to ignite an air-fuel mixture by means of spark plugs mounted to the engine 10. The knocking detecting unit 30 employed in this system detects an ignition signal (not shown) and samples a noise component produced by a vibration on the engine from the output signal from the detecting apparatus 20 during a predetermined period of time or over a predetermined crank angle immediately after the ignition in which no knocking is generated, and then obtains the ratio (there are cases where an integrated value or mean value is employed) between the sampled noise component and the output from the detecting apparatus 20 during a predetermined period of time or over a predetermined crank angle after the piston reaches top dead center (after the peak of compression), in which knocking is easily generated, thereby to detect the existence of knocking. There is also a case where the existence of knocking is detected using probability instead of taking a single signal into consideration. For example, the existence of knocking is judged from the number of times of the generation of knocking per 100 ignitions. The ignition timing control apparatus 40 optimizes the ignition timing in accordance with the existence of knocking thus detected. Since the construction of each of the knocking detecting unit 30 and the ignition timing control apparatus 40 is known, the detailed description thereof is omitted. It is obvious that the detecting apparatus of the invention is applicable to any type of ignition timing control system which is adapted to control the ignition timing through the detection of knocking.

The detecting apparatus 20 in accordance with the invention will be described hereinunder in detail.

Figure 2:
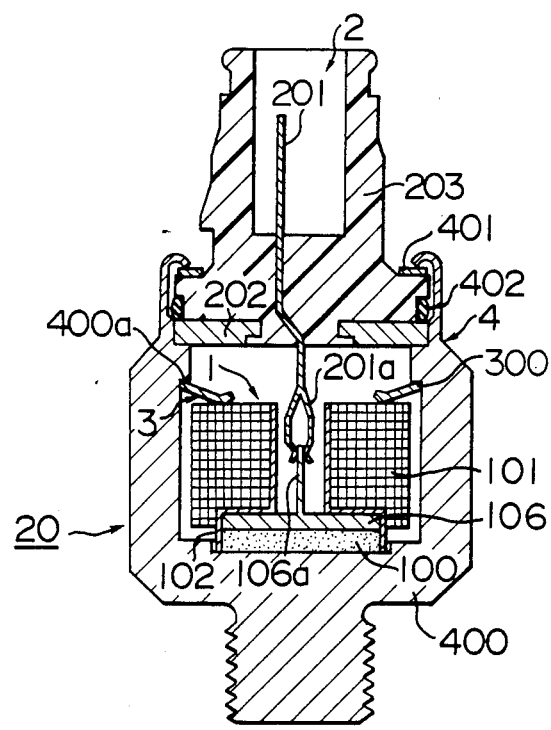
FIG. 2 is an enlarged sectional view of the detecting apparatus shown in FIG. 1.

Referring now to FIG. 2 which shows a first embodiment of the invention, the detecting apparatus 20 comprises a detecting means 1, a connector 2, a bias means 3 and a housing 4.

Figure 3:
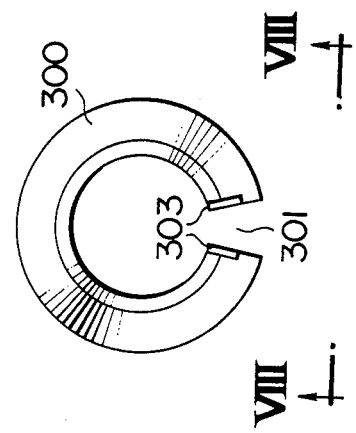
FIGS. 3, 5 and 7 are plan views of the respective initially conical annular springs employed in the detecting apparatus in accordance with the embodiments of the invention.

A piezoelectric element 100 constituting the detecting means 1 is formed into a disc shape and made from a piezoelectric material, such as PZT. The piezoelectric element 100 has a resonance frequency set above 40 KHz so that its frequency characteristic in the knocking frequency band is flat. When an external force is applied to a surface of the piezoelectric element 100, an electric charge corresponding to the intensity of the applied force is generated between the opposite surfaces thereof. One surface of the piezoelectric element 100 is abutted to an end wall portion of a housing body 400 which will be described hereinafter, and is placed at the ground level since the housing is mounted to the engine block. The other surface of the piezoelectric element 100 is abutted to an electrode plate 106 formed into a disc shape and made of a metal. A reference numeral 102 denotes an insulating member, while a numeral 101 represents a weight. The connector 2 is composed of an output pin 201 and a metal ring 202 which are integrally molded by means of a resin 203. The output pin 201 is provided at one end thereof with branched portions 201a for elastically clamping a rod-like projection 106a projecting from the electrode plate 106 toward the connector 2 and the pin 201 is adapted to deliver an output signal from the other end thereof. The metal ring 202 is adapted to be inserted into the housing 4 so that an opening of the housing 4 is capped by the connector 2. The bias means 3 is constituted by an initially conical spring 300. The spring 300 has an annular shape, as shown in FIG. 3, and has a circumferential discontinuous portion 301. Since the spring 300 has an annular shape, a bias load is uniformly applied to the surface of the piezoelectric element 100 through the weight 101.

The housing 4 is composed of a metallic housing body 400, a spacer ring 401 and a waterleakproof O-ring 402. The housing body 400 is formed into a cup shape and provided on an inner peripheral wall thereof with an annular shoulder portion 400a adapted to engage with an outer peripheral edge portion of the spring 300. The provision of the circumferential discontinuous portion 301 makes it possible to mount the initially conical spring 300 onto the shoulder portion 400a. The housing body 400 further has a threaded portion outwardly projecting from its bottom for securing the detecting apparatus to the engine block.

According to the above construction, the piezoelectric element 100 is biased by the spring 300. When the housing body 400 vibrates, a force proportional to the mass of the weight 101 is applied to the piezoelectric element 100 as a load to generate an electric charge between the opposite surfaces thereof, which is delivered as an output signal from the surface abutted to the electrode plate 106 to the outside through the output pin 201.

Figure 5:
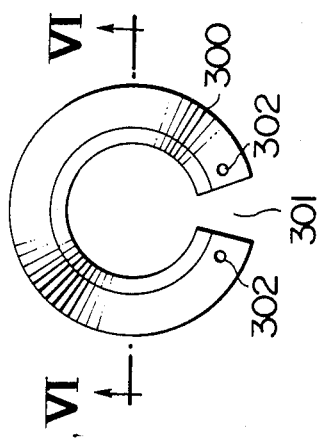
Figure 7:
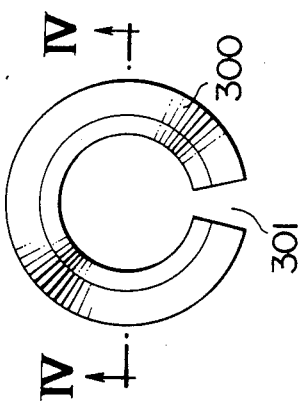
Figure 4:
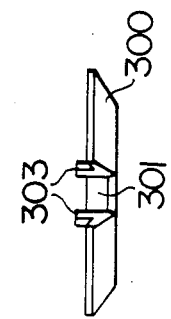
FIGS. 4, 6 and 8 are sectional views taken along the lines IV—IV, VI—VI and VIII—VIII of FIGS. 3, 5 and 7, respectively.
Figure 6:
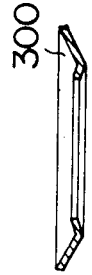
Figure 8:

Since the circumferential discontinuous portion 301 is provided in the initially conical spring 300, it is reduced in diameter by being pressed from its outer peripheral portions, and is thereby mounted to the housing body 400. Furthermore, if the initially conical spring 300 is provided with a pair of holes 302 or projections 303 at portions adjacent to the circumferential discontinuous portion 301 as shown in FIGS. 5 and 7 so that the diameter of the initially conical spring 300 can be reduced by means of a tool through these holes 302 or projections 303, then it becomes also possible not only to mount but to remove the spring 300 from the housing body 400. In other words, even though according to the check of the characteristics of the detecting apparatus after the detecting means 1 and the spring 300 are mounted in the housing body 400 the detecting apparatus is judged to be defective, the elements except for the piezoelectric element 100 and the spring 300 can be reused. The inferior piezoelectric element and the inferior spring can not be reused.

In the above-described first embodiment, the shoulder portion 400a is provided in the housing 4 and the circumferential discontinuous portion 301 is provided in the initially conical spring 300 for prepressing the detecting means 1, thereby allowing the piezoelectric element 100 to be mounted to the housing body 400 without being bored. Accordingly a detecting apparatus is readily assembled and excellent in reliability.

Figure 9:
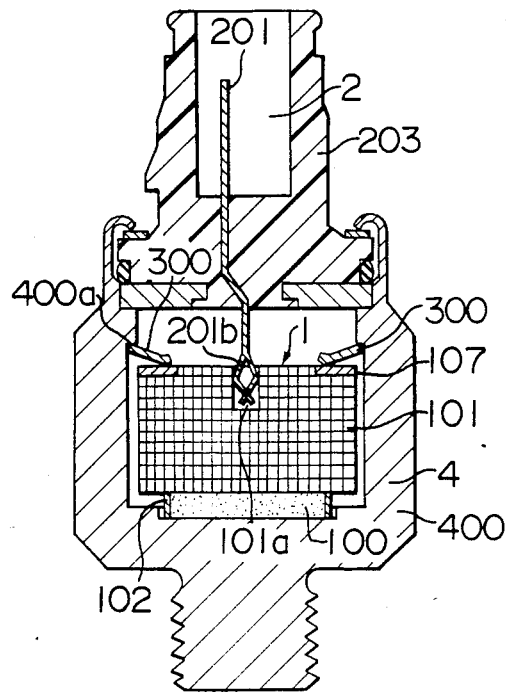
FIGS. 9, 10 and 11 are enlarged sectional views of detecting apparatuses in accordance with other embodiments of the invention, respectively.

A second embodiment of the invention shown in FIG. 9 is made different from the first embodiment in the insulation of the piezoelectric element from the housing body and in the transmission of the signal from the piezoelectric element, thereby to simplify the structure of the detecting apparatus. The following is the description of the differences in structure of the second embodiment from the first embodiment. In the Figures, the same members or the members serving for the like operations are denoted by the same reference numerals. In the second embodiment, the detecting means 1 comprises: a piezoelectric element 100, an insulating tube 102 for effecting insulation between the piezoelectric element 100 and a housing body 400 constituting a housing 4; a weight 101 made of an electrically conductive metal through which a signal from the piezoelectric element 100 is transmitted to an output pin 201 of a connector 2; and an insulating ring 107 for effecting insulation between the weight 101 and an initially conical spring 300 which is disposed between the weight 101 and a shoulder portion 400a in the housing body 400 to bias the detecting means 1. Instead of the insulating tube 102 it may be possible to coat the outer periphery of the piezoelectric element 100 by a heat-resistant resin, such as Teflon. The insulating ring 107 may be made of any material which is rigid and has insulating properties, for example, ceramics. Further, it is possible to employ as the insulating ring 107 an enamel which is applied to and integrated with the surface of the weight 101 to which the spring 300 abuts.

The weight 101 is provided at one end surface thereof opposite to the connector 2 with a recess 101a. The output pin is provided at one end portion thereof with a branched portion 201b which is elastically expanded horizontally wider than the inner diameter of the recess 101a. The opening of the housing body 400 is capped by the connector 2 in such manner that the branched portion 201b is forcedly received into the recess 101a to electrically connect with each other. Accordingly, a direction along which a force is applied to the branched portion 201b of the output pin 201 is perpendicular to a direction along which a vibration to be detected is detected by the detecting means 1, so that the signal from the piezoelectric element 100 can be transmitted without exerting any effect on the detecting means 1.

Figure 10:
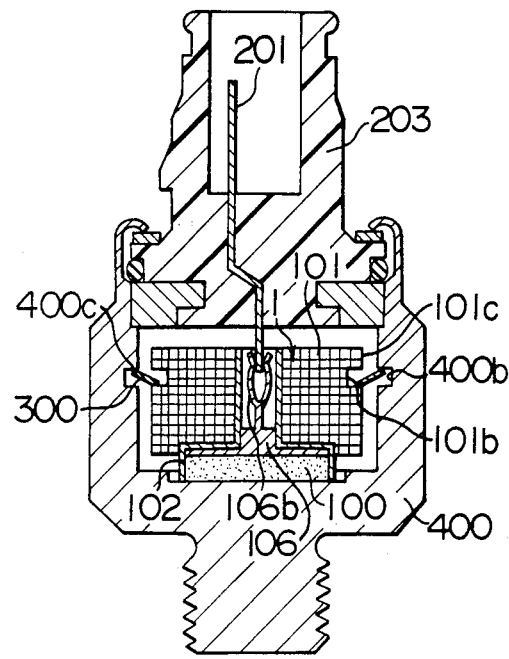

A third embodiment of the invention shown in FIG. 10 differs from the first and the second embodiments in the condition of a spring constituting a bias means. The structure of the detecting apparatus in accordance with this embodiment makes it possible to maximumly utilize the interior space within the housing body 400 and then allows the detecting apparatus to be reduced in size. The following is a brief description of the differences in structure of the third embodiment from the above-described embodiments. A weight 101 is formed into a cylinder with an annular groove 101b formed on a peripheral wall portion thereof 101c. In its natural state, an initially conical spring 300 has an inner diameter smaller than an outer diameter of the wall portion 101c and an outer diameter larger than a diameter of a base portion 400b of an annular groove 400c formed on an inner wall portion of the housing body 400. The spring 300 is mounted to the housing body 400 in such a manner as follows.

At first, the spring 300 is forced into the groove 101b in the weight 101 so as to decrease the diameter of the spring 300, and the weight 101 with the decreased spring 300 is forced inwardly within the housing body 400. When the spring 300 reaches the groove 400c in the housing body 400, the spring 300 increases its diameter by means of a resilient force thereof and brings into engage with the groove 400c. Accordingly, as shown in FIG. 10, the detecting means 1 is biased.

Further, the way of transmitting the signal in this embodiment differs from that in the first embodiment in that an electrode plate 106 has a clipping portion 106b projecting therefrom for elastically clipping an output pin 201 which is formed into a rod-like or tabular shape.

Figure 11:
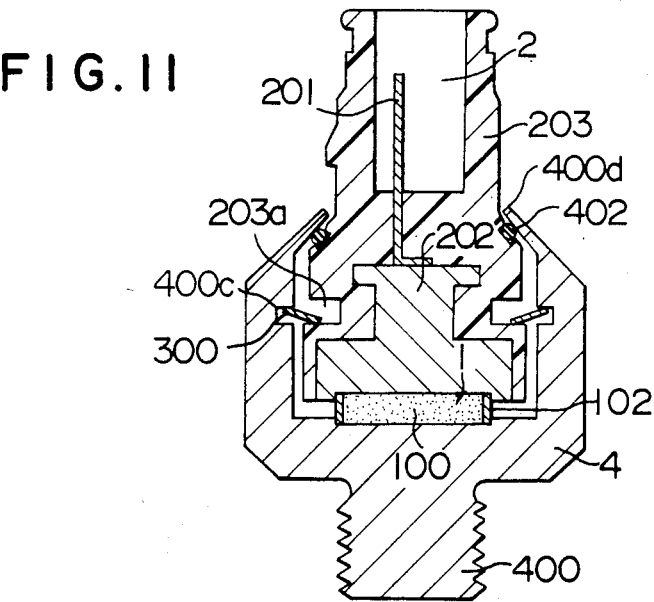

FIG. 11 shows a fourth embodiment of the invention. In this embodiment, a connector serves not only as a connector but as a weight for a detecting means. This structure makes it possible to eliminate not only the weight but the need for any component for transmitting the signal, thereby allowing the number of required components to be much smaller than that in the above-described embodiments.

The detecting means 1 is composed of a piezoelectric element 100 and an insulating tube 102. The connector 2 is composed of an output pin 201 and a metal column 202, which are bonded together and then integrally molded by means of a resin 203. A housing 4 is composed of a housing body 400 and a waterleak-proof O-ring 402. The detecting apparatus in accordance with this embodiment is assembled in the same manner as that in the third embodiment. More specifically, the detecting means 1 is placed on the bottom of the housing body 400, and an initially conical spring 300 is received by an annular groove 203a in an outer peripheral wall portion of the connector 2. After the spring 300 is received by an annular groove 400c in the housing body 400 to secure the connector 2, an opening end portion 400d of the housing body 400 is curled for fixing.

It is to be noted that the groove 400c in the housing body 400 should have such a depth that the initially conical spring 300 can be surely engaged with the groove 400c, since when a load is applied to the spring 300 having a circumferential discontinuous portion as in this embodiment, a force acts in a direction for enlarging the diameter of the spring 300.

Although the invention has been described through specific terms, it is to be noted here that the described embodiments are not exclusive and various changes and modifications may be imparted thereto without departing from the scope of the invention which is limited solely by the appended claims.

What is claimed is:

1. An apparatus of non-resonance type for detecting a vibration generated on an engine block of an internal combustion engine to which said detecting apparatus is mounted, said detecting apparatus comprising:
    a housing having at one end thereof an opening;
    detecting means including a piezoelectric element abutted to a wall portion at the other end of said housing;
    a connector mounted to said opening of said housing to cover it, a signal from said piezoelectric element delivered out through an output pin provided in said connector; and
    means for electrically connecting said detecting means with said output pin so as to transmit said signal from said piezoelectric element to said output pin,
    wherein said detecting apparatus further comprises an initially conical annular spring disposed within said housing so as to bias said piezoelectric element, said spring has a circumferential discontinuous portion therein, and said spring engages at a peripheral edge portion thereof with engaging means provided on an inner peripheral wall of said housing.

2. A detecting apparatus according to claim 1, wherein a hole is provided in each of two portions of said spring facing each other with said discontinuous portion and being adjacent to said discontinuous portion.

3. A detecting apparatus according to claim 1, wherein a projection axially projecting is provided on each of two portions of said spring facing each other with said discontinuous portion and being adjacent to said discontinuous portion.

4. An apparatus of non-resonance type for detecting a vibration generated on an engine block of an internal combustion engine to which said detecting apparatus is mounted, said detecting apparatus comprising:
    a housing having at one end thereof an opening;
    detecting means including a piezoelectric element abutted to a wall portion at the other end of said housing;
    a connector mounted to said opening of said housing to cover it, a signal from said piezoelectric element delivered out through an output pin provided in said connector; and
    means for electrically connecting said detecting means with said output pin so as to transmit said signal from said piezoelectric element to said output pin,
    wherein said detecting apparatus further comprises an initially conical annular spring disposed within said housing so as to bias said piezoelectric element, said spring has a circumferential discontinuous portion therein, and said spring engages at a peripheral edge portion thereof with engaging means provided on an inner peripheral wall of said housing, and said connecting means includes two electrically conductive members elastically clamped to each other by means of an elastic force.

5. An apparatus of non-resonance type for detecting a vibration generated on an engine block of an internal combustion engine to which said detecting apparatus is mounted, said detecting apparatus comprising:
    a housing having at one end thereof an opening;
    detecting means including a piezoelectric element abutted to a wall portion at the other end of said housing;
    a connector provided with an output pin through which a signal from said piezoelectric element is delivered out; and
    means for electrically connecting said detecting means with said output pin so as to transmit said signal from said piezoelectric element to said output pin,
    wherein said detecting apparatus further comprises an initially conical annular spring disposed within said housing so as to bias said piezoelectric element, said spring has a circumferential discontinuous portion therein, said connector is at least partially housed within said housing, and said spring is so disposed that a peripheral edge portion thereof engages with engaging means provided on an inner peripheral wall of said housing and an inner peripheral edge portion of said spring engages with engaging means provided on an outer peripheral wall of said connector whereby said piezoelectric element is biased by said spring via said connector.

* * * * *